United States Patent [19]

Kao

[11] Patent Number: 5,778,217
[45] Date of Patent: Jul. 7, 1998

[54] PARALLEL SIGNAL PROCESSING DEVICE FOR HIGH-SPEED TIMING

[75] Inventor: Ron Kao, Saratoga, Calif.

[73] Assignees: Lite-On Communications Corp., Taipei, Taiwan; Lite-On Communications, Inc., Milpitas, Calif.

[21] Appl. No.: 625,261

[22] Filed: Apr. 2, 1996

[51] Int. Cl.⁶ .................................................. G06F 1/04
[52] U.S. Cl. ...................... 395/558; 395/559; 375/373
[58] Field of Search ............................. 395/551, 553, 395/555, 558, 559; 375/220, 355, 373

[56] References Cited

U.S. PATENT DOCUMENTS

| | | | |
|---|---|---|---|
| 5,329,559 | 7/1994 | Wong et al. | 375/373 |
| 5,642,386 | 6/1997 | Rocco, Jr. | 375/355 |
| 5,668,830 | 9/1997 | Georgiou et al. | 375/220 |

Primary Examiner—Dennis M. Butler
Attorney, Agent, or Firm—Bacon & Thomas, PLLC

[57] ABSTRACT

A parallel signal processing device for high speed timing recovery in a high speed transfer network includes a plurality of data sampling processors (DSP), a central phase-error processor (CPP), and a recovered clock phase adjuster (RCPA. The sampling of transfer data, processing of sampling data, and adjustment of the recovered clock are executed by a plurality of data sampling processors for producing phase difference signals which are then transferred separately to a central phase-error processor. Phase-error adjustment signals for each data sampling processor are produced by the central phase-error processor, and the recovered clock phase for each data sampling processor is adjusted by the recovered clock phase adjuster according to the phase-error. Because the data sampling, phase processing, and adjustment of the recovered clock are simultaneously and parallelly processed by each set of data sampling processors, the high speed recovered clock is readily updated and the data is correctly read by the receiver.

11 Claims, 5 Drawing Sheets

PARALLEL SIGNAL PROCESSING DEVICE FOR HIGH-SPEED TIMING

FIELD OF THE INVENTION

The present invention is related to a processing device for a recovered clock, and especially to a parallel signal processing device for high speed timing recovery.

DESCRIPTION OF THE PRIOR ART

Because of the vast increase of computer information, computers are important tools in many fields. Particularly, in the field of research, computers are used to exchange research information. A transfer medium with a high transfer frequency is necessary to effectively and rapidly integrate with and connect to all types of computer information from different areas, including the sharing of peripheral equipment and databases, and transmissions of E-mail and documents. The present information super highway is used as a communication medium for information. Information used in computers has been developed for multimedia information, which contains vast image and audio data. If this type of information is transferred at a general, slow speed, much more time is necessary for the transmission of the information, resulting in a system which idles for a long time. However, high speed transfer systems, such as, high speed Ethernet and asynchronous transfer mode (ATM) systems, the transfer frequencies of which are 125 Mbps and 155 Mbps, respectively, have been developed to shorten the time of transfer. If a general single processing mode is used to process the recovered clock in a high speed transfer system, it is impossible to update the recovered clock, which results generally in erroneous reading of information received.

SUMMARY OF THE INVENTION

Accordingly, the object of the present invention is to provide a parallel signal processing device for high speed timing recovery in a high speed transfer network.

The parallel signal processing device for high speed timing recovery of the present invention comprises a plurality of data sampling processors (DSP), a central phase-error processor (CPP) and a recovered clock phase adjuster (RCPA), wherein the sampling of transfer data, processing of sampling data, and adjustment of the recovered clock are executed by a plurality of data sampling processors for producing phase difference signals which are then transferred separately to a central phase-error processor. Phase-error adjustment signals for each data sampling processor are produced by the central phase-error processor, and the recovered clock phase for each data sampling processor is adjusted by the recovered clock phase adjuster according to the phase-error. Because the data sampling, phase processing, and the adjustment of the recovered clock are simultaneously and parallelly processed by each set of data sampling processors, the high speed recovered clock is readily updated and data is correctly read by the receiver.

DESCRIPTION OF THE DRAWINGS

The novel features believed to be characteristic of the invention are set forth in the appended claims. The invention itself, as well as features and advantages thereof, will be best understood by reference to the detailed description which follows, read in conjunction with the accompanying drawings, wherein:

DESCRIPTION OF THE PREFERRED EMBODIMENT

Figure 1:
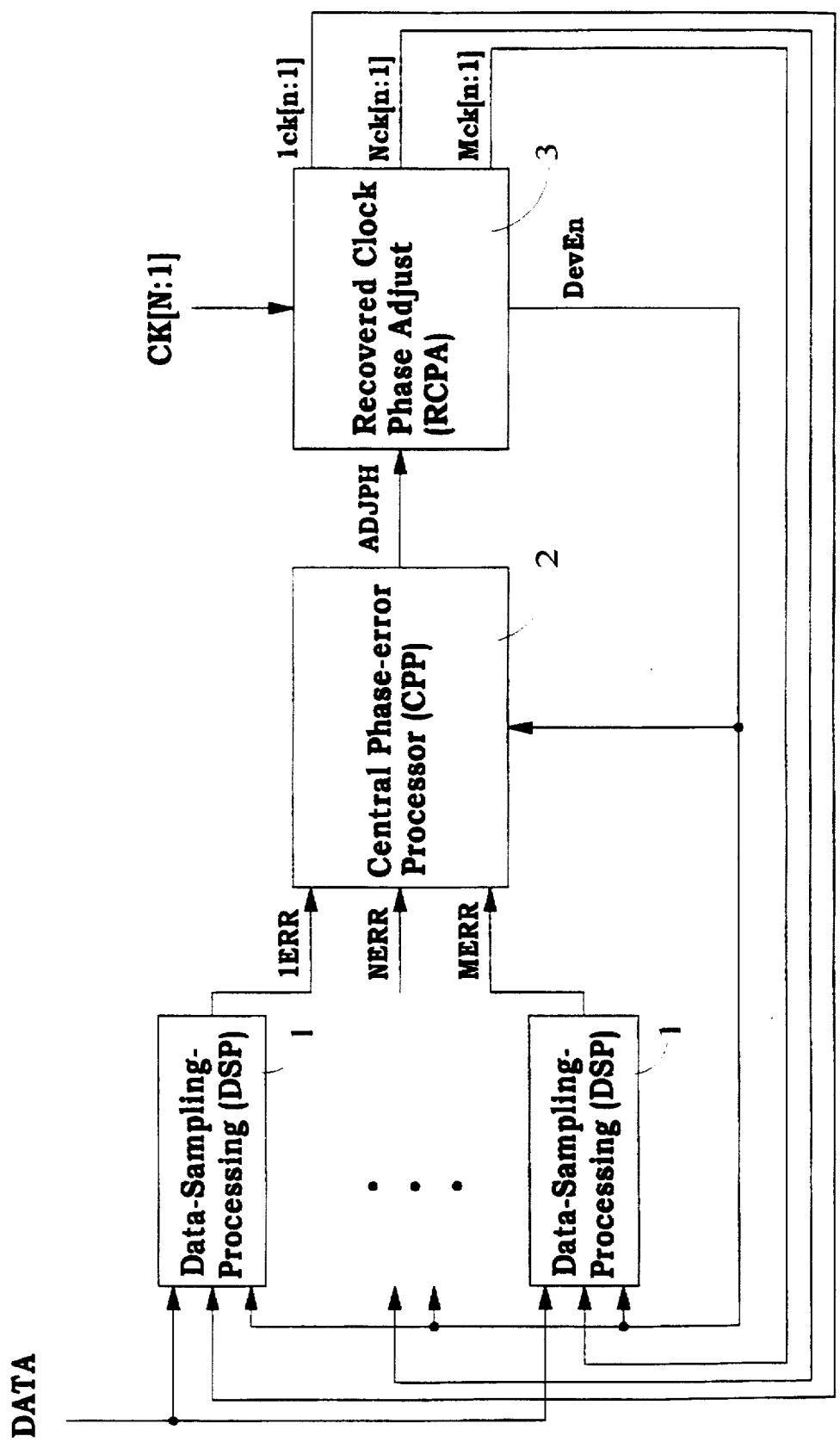
FIG. 1 is a block diagram of the parallel signal processing device for high speed timing recovery of the present invention.

FIG. 1 is a block diagram of the parallel signal processing device for high speed timing recovery of the present invention.

The parallel signal processing device shown in FIG. 1 includes a plurality of data sampling processors (DSP) 1, a central phase-error processor (CPP) 2 and a recovered clock phase adjuster (RCPA) 3.

As shown in the FIG. 1, M sets of sampling clocks 1ck[n:1], 2ck[n:1], ... Nck[n:1], ... Mck[n:1], and a set of control signals DevEn are generated by the recovered clock adjuster 3 base on the external provided reference signal CK[n:1], and transferred separately to each set of data sampling processors 1.

Transfer Data DATA is sampled by each set of data sampling processors 1 according to the control signal DevEn and the sampling clock ck[n:1].

The sampling data is processed and encoded, and then is transferred as phase-error signals 1ERR, 2ERR, ..., NERR, ... MERR to the central phase-error processor 2, which according to the phase-error signals 1ERR, 2ERR, ..., NERR, ... MERR and the control signal DevEn produces a phase-error adjust signal ADJPH for adjusting the sampling clock 1ck[n:1],2ck[n:1], ... Mck[n:1]. Therefore, an updated clock signal ck[n:1] may be transferred to the receiver, thus ensuring acorrect reading by the receiver.

Figure 2:
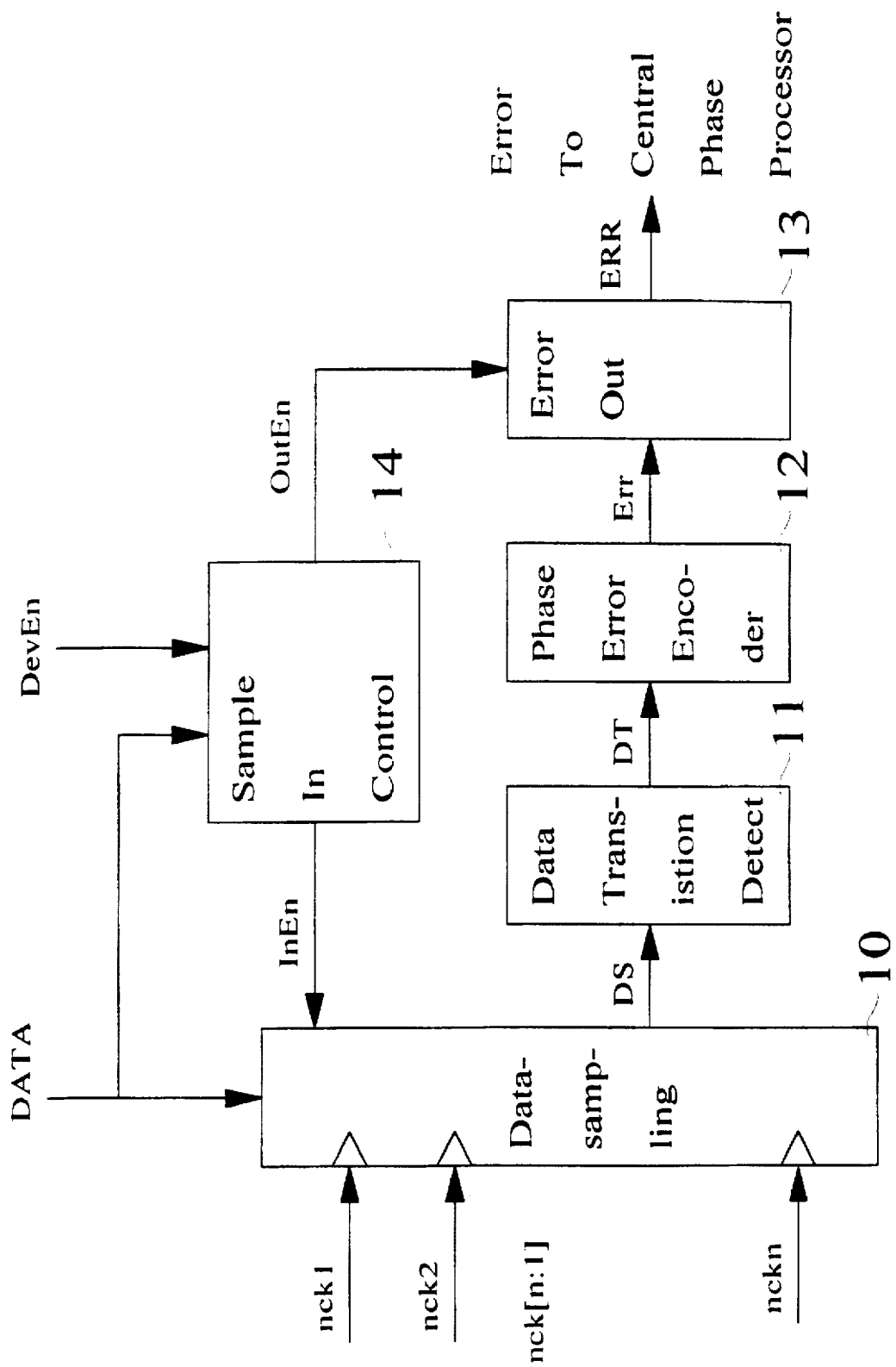
FIG. 2 is a block diagram of the data sampling processor.

FIG. 2 is a block diagram for the nth set of the data sampling processors 1. The main function of the data sampling processors is to sample the transfer data DATA and to produce a phase-error signal ERR. The nth set of data sampling processors includes a sampling data section 10, a detecting section 11 of transfer data, a phase-error encoding section 12, an output section 13 of phase-errors, and a control section 14. An input enable signal InEn and an output enable signal OutEn are produced by the control section 14 according to control signal DevEn and the transfer data DATA. The input enable signal is transferred to data sampling sanction 10, and the output enable signal OutEn is transferred to output section 13. When the input sampling signal InEn is active, a set of sampling data DS is generated by the data sampling section 10 according to the clock nck[n:1] transferred from the recovered clock phase adjuster 3 and sampling transferring data DS, and is then transferred to the detecting section 11. After the sampling data is detected by the detecting section 11, the data transferring signal DT is generated and is then transferred to the phase-error encoding section 12 where the data transferring signal is encoded to error signal Err which is then transferred to the output section 13. When the output enable signal OutEn is active, the error signal Err is transferred to the central phase-error processor 2.

In the plurality of data sampling processors 1, the construction and actions for each set are similar to those for the nth data sampling processor. Only the timings of the input enable signals InEn and output enable signals OutEn generated by the control sections 14 of each data sampling processor are different. Therefore, the data sampling processors 1 have the function of parallel signal processing.

Figure 3:
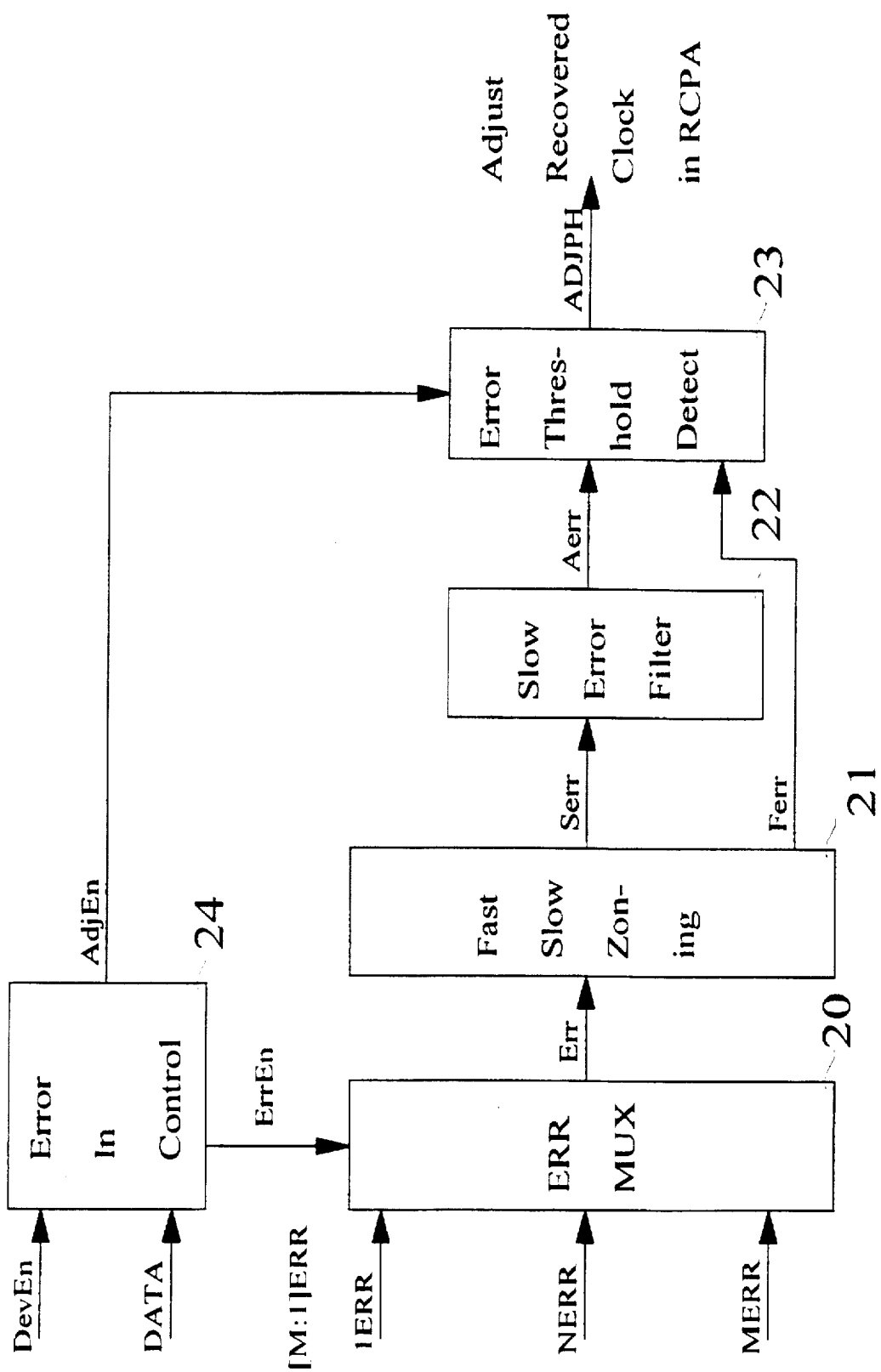
FIG. 3 is a block diagram of the central phase-error processor.

FIG. 3 is a block diagram of central phase-error processor 2. The main function of the central phase-error processor 2 is to transfer the error signal ERR into the recovered clock to adjust signal ADJPH. The block diagram comprises a multiplexer 20, a fast/slow zoning identifier 21, a slow error filter 22, an error threshold detector 23, and a control section 24. An adjust enable signal AdjEn and an error input enable signal ErrEn are produced by the control section 24 according to control signal DevEn and the transfer data DATA. The adjust enable signal is transferred to threshold value detector 23, and the error input enable signal ErrEn is transferred to multiplexer 20. A set of error signals Err is selected by the multiplexer 20 from the error signals 1ERR, 2ERR, . . . , MERR of the plurality of data sampling processors according to the error input enable signal and the error signal is then transferred to the fast/slow zoning identifier 21. The function of the fast/slow zoning identifier 21 is to identify whether the error signal belongs to the range of slow error or to the range of fast error. If the error signal is within the range of slow error, a slow error signal Serr is produced by the identifier 21 and is transferred to slow error filter 22 which generates an accumulated error signal Aerr according to slow error signal Serr, and the accumulated error signal is transferred to the threshold detector 23; If the error signal is within the range of fast error, a fast error signal Ferr is produced by the identifier 21 and is transferred to the threshold detector 23 directly. When the adjust enable signal is active and the accumulated enable signal is greater than or equal to the threshold value, or the high error signal is active, a phase adjust signal is generated by the threshold value detector 23, and is transferred to the recovered clock phase adjuster 3.

Figure 4:
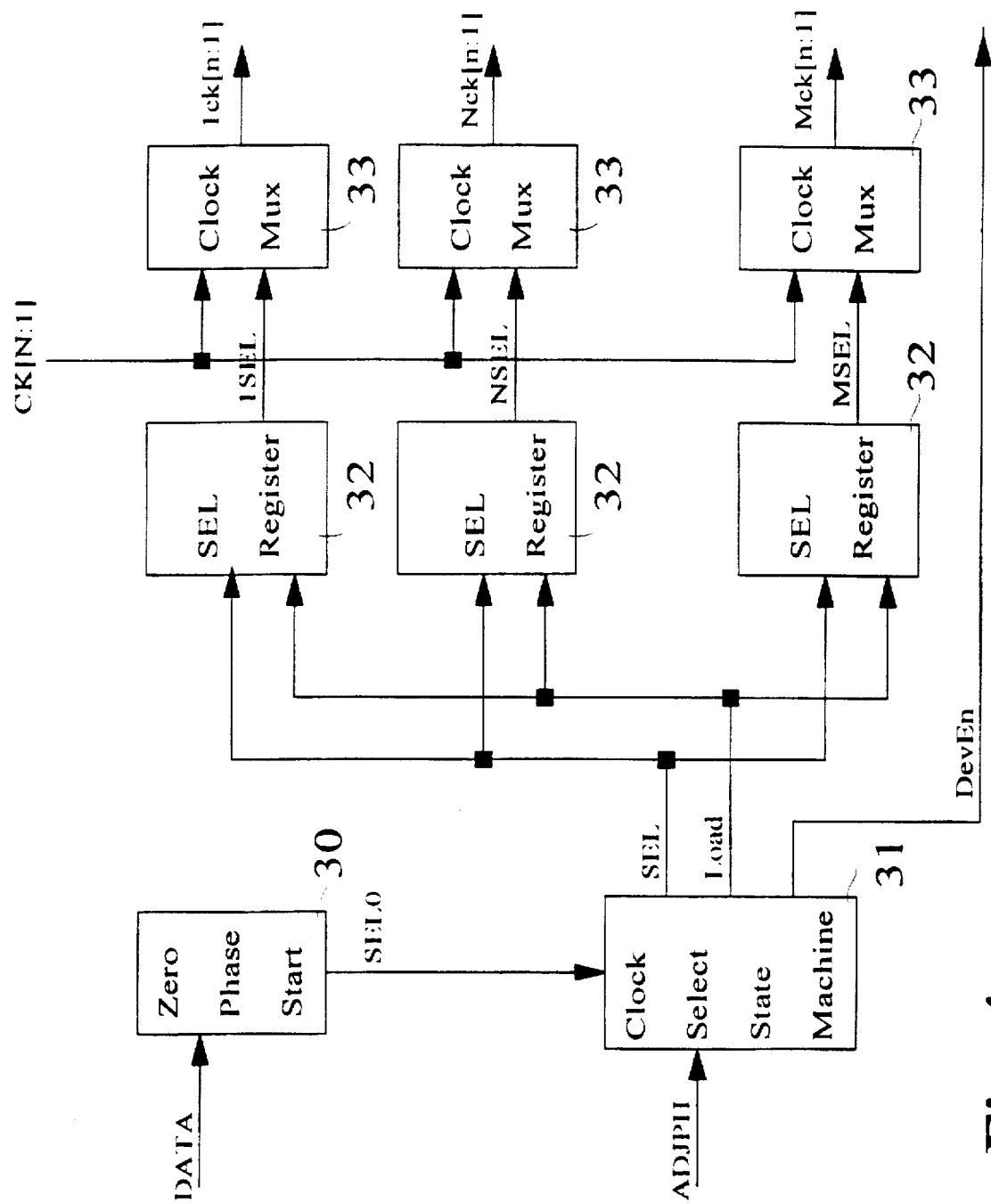
FIG. 4 is a block diagram of the recovered clock phase adjuster.

FIG. 4 is a block diagram of the recovered clock phase adjuster 3. The function of the recovered clock phase adjuster is used to adjust the sampling clock 1ck[n:1], 2ck[n:1], . . . Nck[n:1], . . . Mck[n:1] of each set of the data sampling processors 1. The block diagram comprises a zero phase actuator 30, a central state machine 31, a plurality of selection registers 32, and a plurality of clock multiplexers 33. The function of the zero phase actuator 30 is to detect the first exchange bit of the transfer data and to generate a zero phase selection signal SELO to the central state machine 31 which produces a selection signal SEL and loading signal Load according to the zero phase selection signal SELO so that the correct clock timing is loaded to each set of sampling clocks 1ck[n:1], 2ck[n:1], . . . Nck[n:1], . . . Mck[n:1] through the selection register 32 and the clock multiplexer 33. Simultaneously, the central state machine 31 generates a control signal DevEn to control the action timing of the entire device, which includes control of the sampling timing, the output timing, the adjust enable timing and the error input timing of the central phase-error processors 1. In addition, central state machine 31 generates a selection signal SEL and a loading signal Load according to the phase adjust signal ADJPH of the phase-error processor 2 so as to update the content of each selection register 32, and to update the errors for each set of sampling clocks according to the content of the selection register 32 through each set of clock multiplexers 33.

Because each data transition is sampled by one of data sampling processors 1, it is not possible to update all of the sampling clocks simultaneously. Only the sampling clocks which are not undergoing the process of data sampling are therefore updated. Otherwise, the sampling data being processed by data sampling processor would be destroyed. Therefore, the several selection registers SEL and the multiplexer 33 are selected correctly by the selection signal SEL and the loading signal Load generated by the central state machine 31 so as to update the sampling clocks which are not undergoing processing or data sampling.

Figure 5:
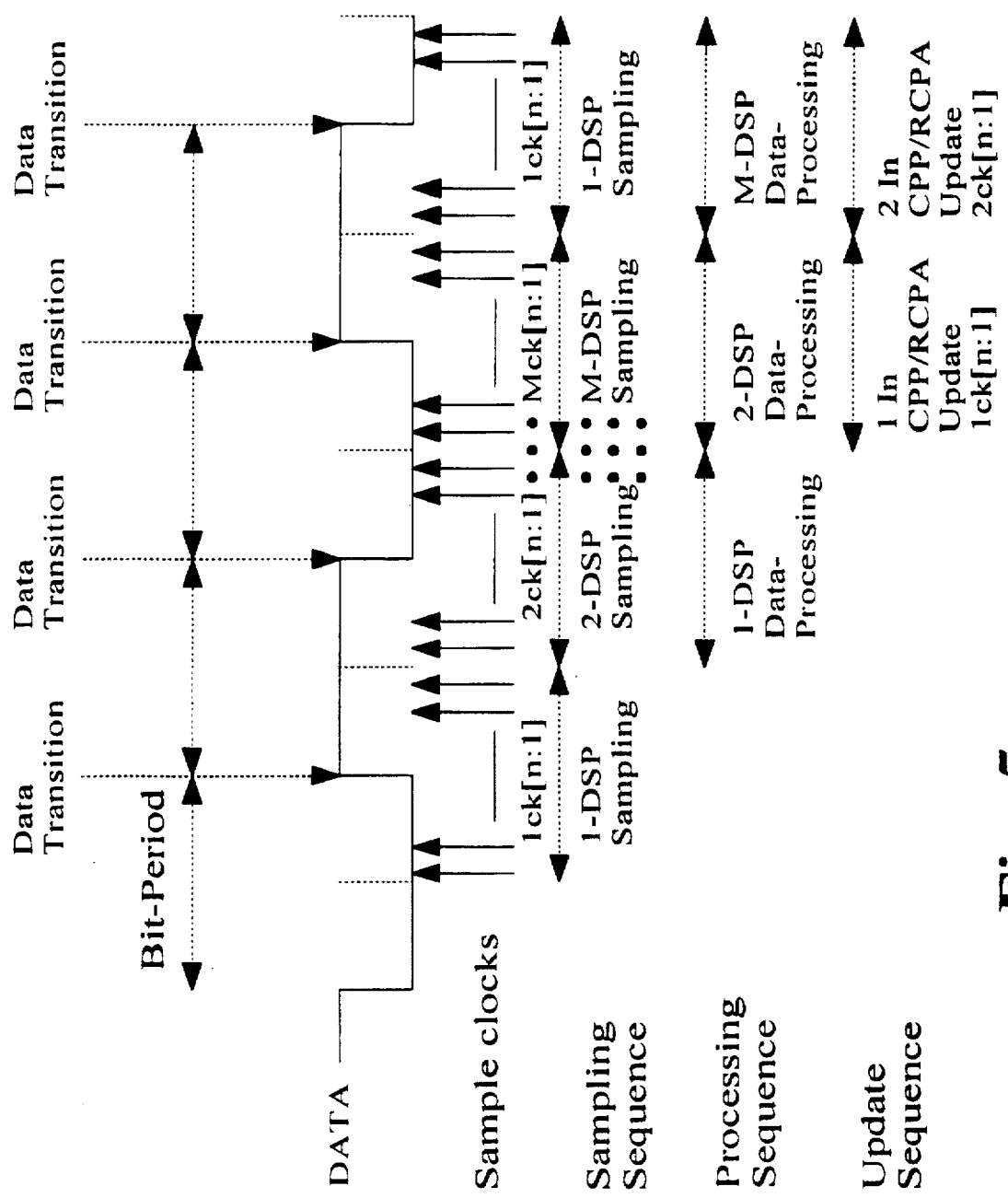
FIG. 5 is a schematic view of the action timing for each set of data sampling processor.

FIG. 5 is a schematic view of the processing timings for different sets of data sampling processors. In this processing timing, it is divided into three different steps which are the data sampling step, the data processing step, and the clock update step. It is clear by the figure that when the transferred data is exchanged in the first bit, a set of data sampling processors (ex. the first set of data sampling processors) is used to sample data. In the exchange of the next bit, of the transferred data (ex. the 2nd bit) another set (ex. 2nd set) of data sampling processors is used to sample the data. Meanwhile, the first set of data sampling processors is used to process the data sampled. In the exchange of the further bit (ex. 3rd bit) of the transferred data, another set (ex. 3rd set) of data sampling processor is used to sample data, at the same time the first and second sets of data sampling processors are used to process the respective first and second data sampled. When the Mth set of data sampling processor is sampling the exchange of the Mth bit of transferred data, the first set of data sampling processor has finished the data processing process of the first bit of the transferred data, so that the sampling clock of the first data processor may be updated. Therefore it is apparent from the action timing of FIG. 5 that during the exchange of each bit there are many sets of data sampling processors performing different processing activities, and thus the parallel signal processing function has been achieved. The number M of the data sampling processors 1 may be adjusted according to the data processing speed.

While this invention has been described with reference to an illustrative embodiment, this description is not to be interpreted as being limiting. Various modification and combination of the illustrative embodiments, as well as other embodiments of the invention, will be apparent to persons skilled in the art upon reference to the description. It is therefore intended that the appended claims encompass any such modifications or embodiments.

I claim:

1. A parallel signal processing device for high speed timing recovery comprising a plurality of data sampling processors, a central phase-error processor and a recovery clock phase adjuster, wherein said sampling processors sample transfer data sequentially and process sampling data, and an error message derived from the processing the sampling data is transferred to the central phase-error processor, the central phase-error processor processing the error message for each data sampling processor to produce a terminal phase-error signal which is then transferred to the recovered clock phase adjuster which adjusts the phase of the sampling clock for each data sampling processor according to the terminal phase-error signal, whereby at the same time a set of said data sampling processors samples the transferred data, another set or sets of said data sampling processors processes the sampling data, and further a set or sets of said data sampling processors adjusts the sampling clocks to provide parallel signal processing and high speed updating of a recovered clock.

2. The parallel signal processing device for high speed timing recovery as claimed in claim 1, wherein the recovered clock phase adjuster comprises a zero phase actuator, a central state machine, a plurality of selection registers, and a plurality of clock multiplexers, the zero phase exchange being detected rapidly by using the zero phase actuator at the recovered clock phase adjuster, and the central state machine outputing a control signal to each set of selection registers to rapidly produce a correct sampling clock.

3. The parallel signal processing device for high speed timing recovery as claimed in claim 2, wherein the contents of the selection registers and the multiplexers are adjusted by the central state machine so as to update each set of sampling clocks.

4. The parallel signal processing device for high speed timing recovery as claimed in claim 2, wherein the central state machine outputs a control signal for controlling the action timing of each set of data sampling processors and the central phase-error adjuster.

5. The parallel signal processing device for high speed timing recovery as claimed in claim 1, wherein the central phase-error processor comprises an error controller, a multiplexer, a fast/slow zoning identifier, a slow error filter, and a threshold detector, and the function of said central phase-error processor is to process the error signal produced by the data sampling processors and to produce a phase adjustment signal.

6. The parallel signal processing device for high speed timing recovery as claimed in claim 5, wherein an adjust enable signal and an error input enable signal are produced by the control section to control the threshold detector and multiplexer so as to correctly input data and output said phase adjustment signal.

7. The parallel signal processing device for high speed timing recovery as claimed in claim 5, wherein the function of the fast/slow zoning identifier is to identify whether the error signal belongs to the range of slow error or the range of fast error; if the error signal is within the range of slow error, a slow error signal is produced thereby, if the error signal is within the range of fast error, a fast error signal is produced thereby.

8. The parallel signal processing device for high speed timing recovery as claimed in claim 5, wherein a slow error signal of a detector for coarse adjustment/fine adjustment of the error signal is filtered by the slow error filter and then is transferred to the threshold detector, and wherein a fast error signal is transferred directly to the threshold detector.

9. The parallel signal processing device for high speed timing recovery as claimed in claim 1, wherein each of said data sampling processors includes a sampling data processing section, a transfer data detecting section, a phase-error encoding section, a phase-error output section, and a control section; and the main function of the data sampling processor is to sample the transfer data, to process the sampling data, and to transfer the processed data to a phase-error signal.

10. The parallel signal processing device for high speed timing recovery as claimed in claim 9, wherein an input enable signal and an output enable signal are produced by the control section to control the data sampling section and the phase-error output section, respectively.

11. The parallel signal processing device for high speed timing recovery as claimed in claim 9, wherein the timing sequences of input enable signals and output enable signals for each data sampling processor are different from each other.

* * * * *